Patented Apr. 25, 1939

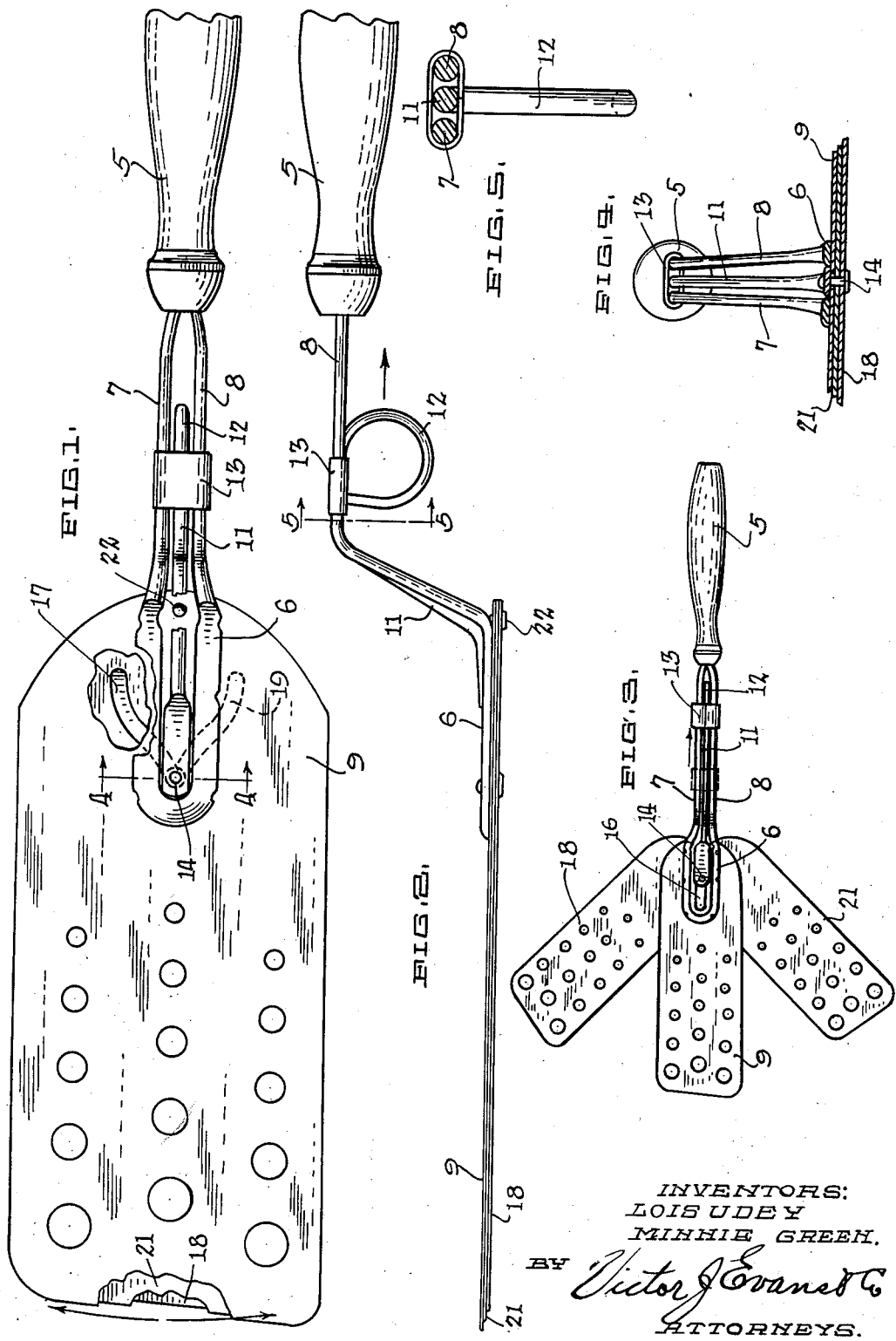

2,156,014

UNITED STATES PATENT OFFICE 2,156,014

KITCHEN UTENSIL

Minnie Greene and Lois Udey, El Segundo, Calif.

Application November 29, 1937, Serial No. 177,152

1 Claim. (Cl. 294—7)

This invention relates to improvements in kitchen utensils and has particular reference to an implement for use in lifting various commodities of relatively large size, as, for instance, a large roast, or a fowl, from a pan or other cooking utensil without breaking the same during the lifting operation.

A further object is to provide means for adjusting the width of the lifting implement after the implement has been placed beneath the commodity to be lifted.

A further object is to provide a simple means of adjusting the width whereby the same will be accomplished in an efficient and quick manner.

A further object is to produce a device of this character which is economical to manufacture.

Other objects and advantages will be apparent during the course of the following description.

In the accompanying drawing forming a part of this specification and in which like numerals are employed to designate like parts throughout the same, Fig. 1 is a top plan view of our invention;

Fig. 2 is a side elevation of Fig. 1;

Fig. 3 is a view similar to Fig. 1 on a reduced scale, showing the device expanded;

Fig. 4 is a detailed view in cross section taken on the line 4—4 of Fig. 1; and

Fig. 5 is a detailed view in cross section taken on the line 5—5 of Fig. 2.

The average implement, commonly termed "a pancake turner", is relatively narrow and, therefore, does not offer a very large support for a comparatively heavy roast. Consequently, in using such an implement, the roast may fall or be torn apart in the effort of lifting the same with a fork.

Applicants have, therefore, devised a simple implement, having the same physical dimensions as the ordinary turner, which may be initially placed beneath the commodity and later expanded so as to underlie a major portion thereof.

In the accompanying drawing wherein for the purpose of illustration is shown a preferred embodiment of our invention and by referring to Fig. 1, it will be noted that the numeral 5 designates a handle having a U-shaped member 6, terminating in wires 7 and 8, which enter the handle 5. The U-shaped member is secured to a blade 9, which we will consider as being the top blade. In the present instance, we have shown the handle in a plane above this top blade. It is obvious, however, that the same may be in the same horizontal plane as the top blade without altering the spirit of the invention. Positioned between the wires 7 and 8 is a rod 11 having a finger loop 12, which finger loop is secured to a slider 13 movable on the wires 7 and 8. The rod 11 has its forward end provided with a pin 14 passing through a slot 16 formed in the blade 9; thence through a slot 17 formed in a blade 18; thence through a slot 19 formed in a blade 21, the blades 18 and 21 being pivoted as shown at 22 to the blade 9.

By referring to Fig. 1, it will be noted that the slots 17 and 19 are cam-shaped whereby when the finger loop 12 is moved in the direction of the arrow of Fig. 2, the pull upon the rod 11 will cause the pin 14 to move rearwardly in the slots; and through the cam action of the slots 17 and 19, the blades 18 and 21 will be spread a distance, depending upon the amount of movement of the rod 11. In other words, the blades 9, 18, and 21 may be fanned out only a short distance or to the complete limit of their action. Thus, by a simple manipulation of the device, it is apparent that the same will accomplish all the objects above set forth.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:

In a device of the character described, a handle, a U-shaped member connected to said handle, a movable rod carried by said U-shaped member, a blade secured to said U-shaped member, a pair of auxiliary blades pivoted to said first-mentioned blade, and connecting means between said rod and said blades, whereby movement of said rod will cause movement of said auxiliary blades, said means including cammed slots formed in said auxiliary blades and a pin carried by said rod and engaging said cammed slots.

MINNIE GREENE.
LOIS UDEY.